UNITED STATES PATENT OFFICE.

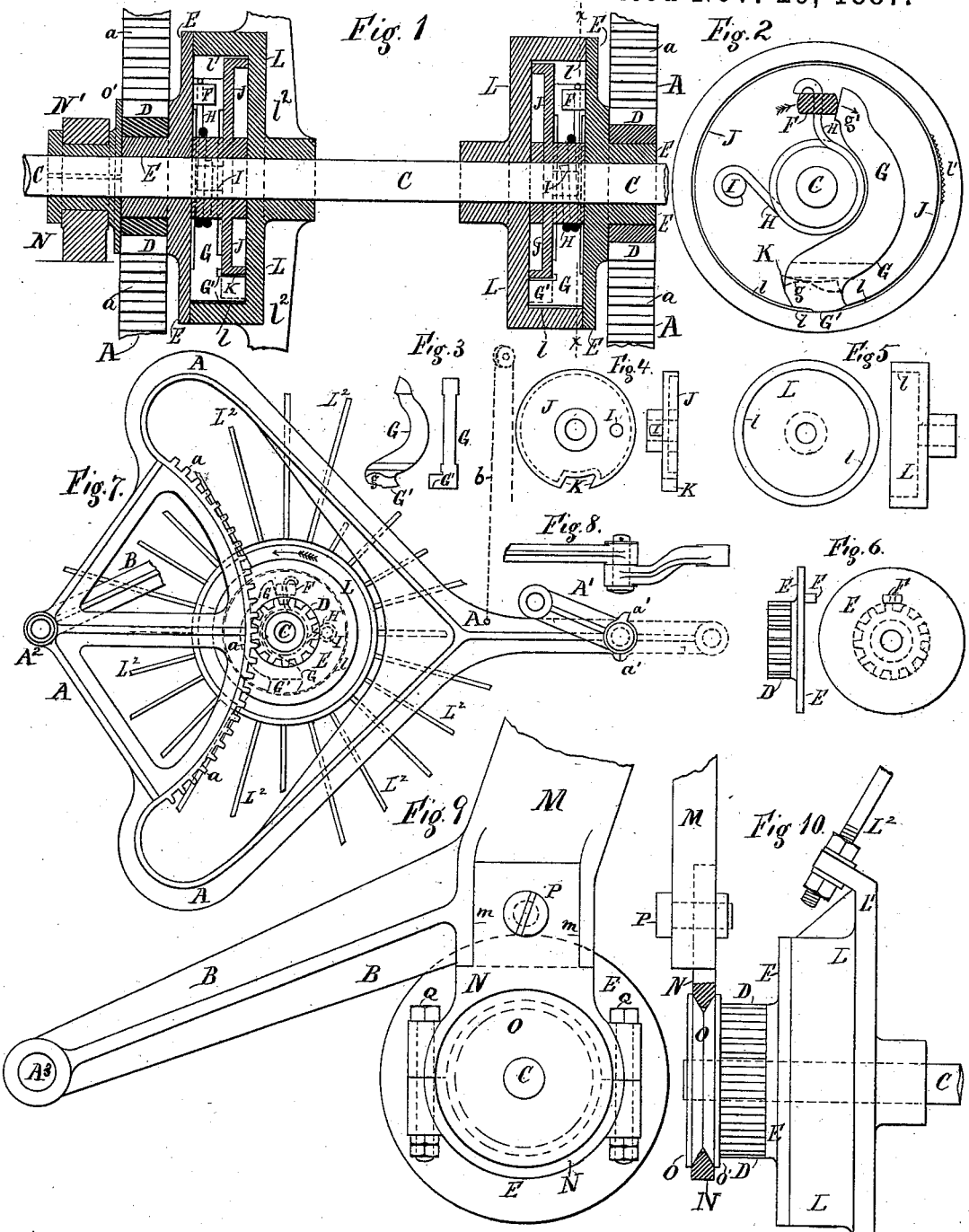

EDWIN WINANS, OF NEW YORK, N. Y.

POWER-TRANSMITTING MACHINERY.

SPECIFICATION forming part of Letters Patent No. 374,027, dated November 29, 1887.

Application filed March 17, 1887. Serial No. 231,232. (No model.)

*To all whom it may concern:*

Be it known that I, EDWIN WINANS, a citizen of the United States, residing in the city, county, and State of New York, have invented certain new and useful Improvements in Power-Transmitting Machinery, of which the following is a specification, reference being had to the accompanying drawings.

My invention relates specially to that class of machinery by and through which power is developed and transmitted by the use of the treadle. The invention may, however, be applied to the transmission of large powers in proportion to the strength of the several details, parts, and connections.

The invention is easily adapted to all movements and operations exemplified by the bicycle, the foot-lathe, the sewing-machine, jig-saw, vehicles, and all similarly-operating machines.

In the accompanying drawings, Figure 1 represents a sectional view through a pair of transmitters applied to a shaft and embodying a portion of my improvements. Fig. 2 represents a section on line $xx$ of Fig. 1, looking into the inclosing-hub. Figs. 3, 4, 5, and 6 represent detail portions of transmitting-coupling. Fig. 7 represents the transmitter applied to the hub of a bicycle-wheel, or, in fact, any other kind of wheel; also, an operating-lever suspended in position for developing power and motion; also, an extension branch for increasing or decreasing leverage. Fig. 8 represents a plan view of treadle end of operating-lever and attached extension branch. Figs. 9 and 10 represent views of saddle-fork ends of a bicycle with improved friction grip or bearing.

Similar letters of reference designate like parts in all the figures.

A designates the operating-lever of this combination, to which power is originally applied preferably by means of the foot-treadle. They are preferably used in pairs, and where increased power is required a special extension branch, A', is applied between the operating-lever and the foot-treadle. By swinging such extension branch toward or from the fulcrum, as shown in Figs. 7 and 8, the length of leverage is increased or decreased in proportion to the length of the extension branch.

Stops or lugs $a'$ are attached to the hubs of the lever and extension to retain the extension branch in fixed position for work. When it is swung back, as shown in Fig. 7, it rests securely on the operating-lever itself. Any equivalent means for holding this extension-arm in proper position may of course be used. This extension branch A' may be omitted and the treadle applied direct to the operating-lever A.

At $A^2$ is the swing-center or fulcrum-bearing for the operating-lever. Upon this center it may be suspended, preferably, in a vertical position, or in a horizontal position, or at any angle between the two. When a horizontal position is adopted—such as, for instance, in the bicycle—a counterbalance-cord, $b$, passing from one to the other of a pair of treadles, or equivalent return means may be used, so that the treadles may be at all times in position for work. In ordinary machine practice the operating-lever is kept preferably to a vertical swing.

B designates a supporting-arm extending in any direction most convenient to a treadle motion and carrying fulcrum-bearing $A^3$ for operating-lever. It is here shown as applied to the saddle-fork M of a bicycle. In machine practice the fulcrum-bearing may be an independent bearing located in any convenient position for the operation of the lever and treadle.

C designates a shaft upon which the portions composing the transmitting-coupling operate. They may operate either independent of or in direct connection with the shaft. The shaft may remain fixed and act as a bearing for the transmitting-couplings, hereinafter detailed, or it may revolve in connection with said coupling.

D designates a pinion, preferably used on account of the positive grip and attached securely to a hub forming part of a pressure-disk, E. This pinion is operated by a rack attached at $a$ to the operating-lever. The pressure-disk E is provided with a projecting lug, F, which, when the pressure-disk is revolved, presses against the face $g'$ of a lever-grip, G. When so pressed, the lever-grip G moves on a fulcrum, $g$, wearing in a pocket, K, in a guide-disk, J. By means of lugs I and F on disks J and E and a spring, H, the two disks J and E are connected.

L designates a hollow wheel-hub inclosing the disk J, lever-grip G, and releasing spring H, and covered by operating-disk E. When the lever-grip G is moved on its fulcrum $g$, pressure is brought by the lever G upon the inner surface, $l$, of the hollow hub L, as shown at G', and by the resulting pressure the hollow hub is gripped and caused to revolve. If this hollow hub is keyed fast to the shaft upon which it works, or if it be fastened to any wheel, pulley, or fly-wheel, such parts to which it is fastened will revolve with it.

In Fig. 10 is shown means for attaching the hollow hub L to spokes $L^2$ of a wheel, more especially the spokes of a bicycle-wheel, only one-half of the bicycle-hub connection being shown, two of these hubs and the contained mechanism being necessary to the operation of such wheel.

In Fig. 1 portions of wheel-arms $l^2$ are shown cast on one of the hollow hubs L.

In Figs. 9 and 10 an improved bearing is shown as applied to the saddle-fork of a bicycle. This bearing consists of a grooved disk, O, into which a strap or bearing wears, such strap or bearing being made in portions and held together by bolts Q. When the shaft or axle revolves with the hollow hub, as already stated, the straps N and N' are joined to form a bearing, within which the disk O revolves with minimum friction. When, however, the shaft or axle does not revolve with the hollow hub, the straps N and N' are screwed up tight to clamp the disk O, and the whole becomes stationary and the shaft or axle becomes the bearing upon which the wheel revolves. For machine purposes, ordinary bearings are used for the shaft, as shown at N, Fig. 1, the brasses taking the place of disk O and the box that of the straps N and N'.

O' is a disk set up alongside of pinion to keep the rack or lever in line for work.

$l'$ in Fig. 2 designates a jagged surface as applied to a portion of the inner surface of the hollow hub L.

$l^2$ designates portions of wheel-arms as attached directly to the hollow hub L.

In the general operation of this device, power is applied and motion given to the lever A as an operating-lever. From this operating-lever motion is transmitted, preferably by gear or by equivalent means, to a pressure-disk, E, thence by means of the lug F to the lever-grip G, which presses against the internal periphery face of the hollow hub L and causes it to revolve, carrying motion to whatever may be attached to it. To increase the grip between the lever G and the hollow hub L, the inner periphery surface of the wheel and the face of the lever-grip G may be jagged, as shown at $l'$, Fig. 2. With the movement of the lever-grip G, the lugs I and F are separated in a radial direction and the spring H extended. With the reverse movement of the operating-lever A, the revolution of the pressure-disk E is reversed, the grip G is released, and the spring H closes, leaving the whole free to revolve within the hollow hub L in a non-gripping direction. By alternate to-and-fro motions of a pair of levers and their associate transmitters a steady and easy revolution is effected.

A special and new feature in connection with the operating-lever—especially when applied to a bicycle, for instance—is contained in the extension branch A'. The usefulness of this extension is not confined to any particular lever, but may be adapted to all levers not developing a complete revolution in their movements. With the bicycle extra power is required for uphill practice. On approaching an uphill portion of a road the extension branch A' is swung out to its full reach, and the leverage increased accordingly. For downhill purposes, or for level roads, the branch may at once be swung in without stopping. Where extra leverage may be required for any style of machine, this same extension may be adopted.

Any equivalent means for turning the pressure-disk E—such as friction wheels and faces, spool, and belt, after the manner of the fiddle-drill—may be used in place of the rack and pinion, as shown.

What I claim as new, and desire to secure by Letters Patent, is—

1. In combination with an operating-lever and rack, a pinion operated by said rack, a pressure-disk to which the pinion is attached, a lever-grip forced to act upon the inner surface of the rim of an inclosing-hub by pressure through a lug attached to said pressure-disk, a guide-disk holding the lever-grip up to its work by means of a fulcrum-pocket at the edge of said disk, and a releasing-spring connecting the said pressure-disk and guide-disk, substantially as and for purposes set forth.

2. In combination with an operating-lever and rack, pinion D, outer pressure-disk, E, lever-grip G, having an end adapted to fit and operate within a pocket in guide-disk J, a releasing-spring, H, connecting disk E with disk J, and an inclosing-hub, L, substantially as and for purposes set forth.

3. In combination with a shaft through which power is transmitted, a grooved bearing-disk, O, securely attached to said shaft, and a bearing-strap composed of the portions N and N', substantially as shown and described.

4. In combination with an operating-lever and rack, a pinion, D, pressure-disk E, lever-grip G, inner guide-disk, J, hollow hub L, and a shaft upon or through which the whole operates, substantially as set forth.

5. In combination with the supporting-arm B, extending from the saddle-fork of a bicycle, a vibrating arm or lever attached to the fulcrum-bearing of said supporting-arm, a rack attached to said vibrating lever and operating a pinion attached to pressure-disk E, lever-grip G, having an end adapted to fit and operated within a pocket in guide-disk J, and hollow hub L, substantially as and for purposes specified.

6. The combination of the supporting-arm B, operating arm and rack A, with extension branch A', pinion D, pressure-disk E, spring H, lever-grip G, guide-disk J, hollow hub L, and shaft C, upon or through which the whole operates, substantially as set forth.

EDWIN WINANS.

Witnesses:
 WM. H. WEIGHTMAN,
 A. M. PIERCE.